United States Patent
Schwab

(10) Patent No.: US 9,878,413 B2
(45) Date of Patent: Jan. 30, 2018

(54) COUNTERBALANCE AND DRIVE SYSTEM FOR MACHINE SLIDE MECHANISM

(71) Applicant: Quality Vision International, Inc., Rochester, NY (US)

(72) Inventor: Frederick D. Schwab, Atlanta, GA (US)

(73) Assignee: Quality Vision International, Inc., Rochester, NY (US)

( * ) Notice: Subject to any disclaimer, the term of this patent is extended or adjusted under 35 U.S.C. 154(b) by 165 days.

(21) Appl. No.: 15/051,287

(22) Filed: Feb. 23, 2016

(65) Prior Publication Data

US 2017/0239769 A1 Aug. 24, 2017

(51) Int. Cl.
*G01B 5/00* (2006.01)
*B23Q 11/00* (2006.01)

(52) U.S. Cl.
CPC ...... *B23Q 11/0028* (2013.01); *B23Q 11/0017* (2013.01)

(58) Field of Classification Search
CPC .. G01B 5/012; G01B 11/2441; G01B 21/047; G01B 9/02044; G01B 9/02071; G01B 9/02091; G01B 9/0209; G01B 11/02; G01B 11/022; G01B 11/0616; G01B 11/245; G01B 11/25; G01B 21/04; G01B 5/0014; G01B 5/008; G01B 5/066; B23Q 11/0017; B23Q 11/0028
USPC .......................................................... 33/503
See application file for complete search history.

(56) References Cited

U.S. PATENT DOCUMENTS

| | | | |
|---|---|---|---|
| 4,093,259 A | 6/1978 | Stedman | |
| 4,719,811 A | 1/1988 | Lang et al. | |
| 4,964,221 A * | 10/1990 | Breyer | G01B 5/0016 33/1 M |
| 5,072,522 A * | 12/1991 | Stott | B23Q 11/0017 33/1 M |

(Continued)

FOREIGN PATENT DOCUMENTS

| | | |
|---|---|---|
| DE | 3422586 A1 | 12/1985 |
| JP | S52135581 U | 10/1977 |
| JP | S5467947 A | 5/1979 |

OTHER PUBLICATIONS

International Search Report and Written Opinion from corresponding International Application No. PCT/US2016/068198 dated May 11, 2017.

*Primary Examiner* — Yaritza Guadalupe-McCall
(74) *Attorney, Agent, or Firm* — Thomas B. Ryan; Harter Secrest & Emery LLP

(57) ABSTRACT

A counterbalance and drive system for a machine slide mechanism includes a counterbalance system having a first flexible connector suspended from a machine mount and interconnecting a slide mechanism and a counterweight and a drive system having a second flexible connector suspended from the machine mount and interconnecting the slide mechanism and the counterweight. The drive system includes both a drive motor operatively engaged along a length of the second flexible connector for vertically displacing the slide mechanism and a compliant connector operating within a limited range of compliance that imparts a regulated amount of tension along at least a portion of the length of the second flexible connector between the engagement of the drive motor and the counterweight.

37 Claims, 5 Drawing Sheets

(56) References Cited

U.S. PATENT DOCUMENTS

| | | | | |
|---|---|---|---|---|
| 6,058,618 | A * | 5/2000 | Hemmelgarn | G01B 1/00 33/503 |
| 6,193,018 | B1 | 2/2001 | Schroder-Brumloop et al. | |
| 6,397,485 | B1 * | 6/2002 | McMurtry | B25J 17/0266 33/503 |
| 8,375,594 | B1 * | 2/2013 | Guenther | B25J 19/0008 33/503 |
| 2013/0047452 | A1 * | 2/2013 | McMurtry | G01B 5/0016 33/503 |
| 2014/0340693 | A1 * | 11/2014 | De La Maza Uriarte | G01B 5/008 356/625 |
| 2016/0161250 | A1 * | 6/2016 | Nakamura | G01B 11/2518 356/610 |
| 2017/0239769 | A1 * | 8/2017 | Schwab | B23Q 11/0028 |

* cited by examiner

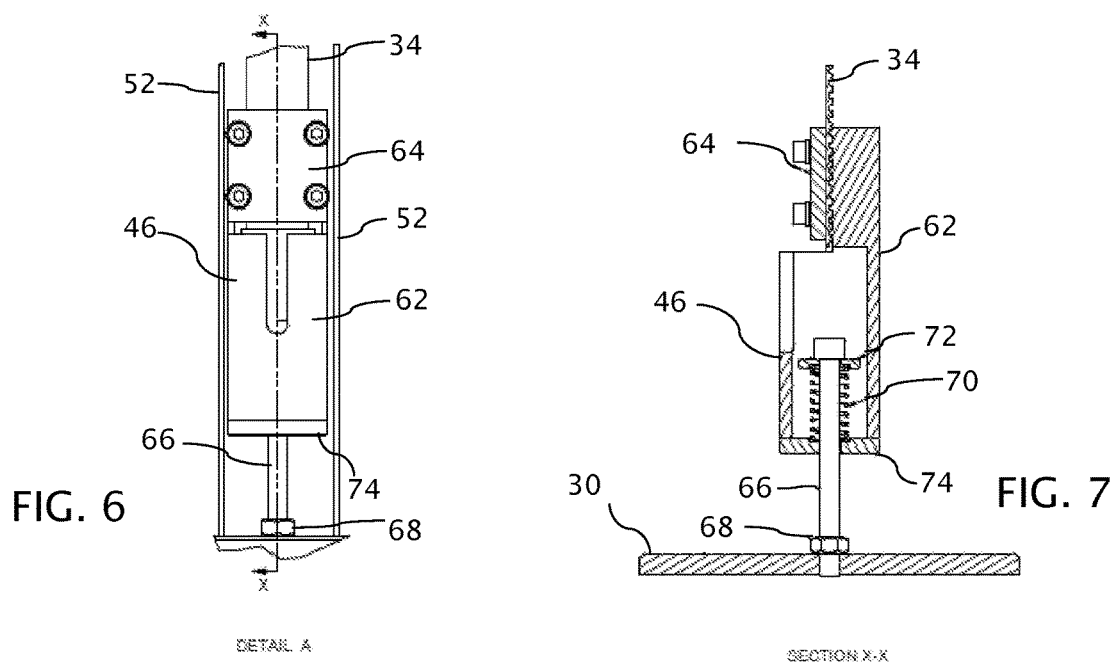

COUNTERBALANCE AND DRIVE SYSTEM FOR MACHINE SLIDE MECHANISM

TECHNICAL FIELD

The invention relates to the counterbalancing and controlled displacement of vertically displaceable slide mechanisms.

BACKGROUND OF THE INVENTION

Machines of various sorts include motorized stages including carriages and other slide mechanisms as well as spindles and pivots for effecting relative translational or rotational motions along or about machine axes. The relative motions can be carried out, for example, between tools and workpieces on machine tools or between sensors and test parts on measuring machines.

The motorized stages are supported for relative motion directly on a machine frame or indirectly on other motorized stages. Guide systems include rails, bearings, shafts, ways, and rollers for defining the desired motions. Typical linear drives include belts, rack and pinions, ball screws, and lead screws powered by stepper or servo motors.

Belt drives transform rotary motion to linear motion via a timing belt that typically contains teeth in engagement with a similarly toothed pulley driven directly or indirectly by a drive motor. When implementing a linear belt drive on a vertical (Z-axis) of a machine, a counterbalance is often needed to offset the weight of a vertically displaceable slide mechanism. As such, one end of the timing belt, which is otherwise supported by one or more pulleys attached to the machine frame or other form of mount, is affixed to the vertically displaceable slide mechanism and the other end of the timing belt is affixed to a counterweight. One of the pulleys is a drive pulley connected directly or indirectly through a gear reducer or other power allocator to a rotary drive motor. The mass of the counterweight which is equal or nearly equal to the mass of the vertically displaceable slide mechanism creates a balanced load or nearly balanced load on either side of the drive pulley. The balanced load reduces the amount of holding force that must be exerted by the motor to keep the vertically displaceable slide mechanism in a constant Z-axis location. This reduces the amount of heat created by the motor and can also allow for a smaller less expensive motor to be used.

One problem with this known implementation can arise should the vertically displaceable slide mechanism encounter an unexpected obstruction while being lowered. Despite the presence of a counterweight, the entire weight of the slide mechanism can rest on the obstruction, because by even slightly overdriving the slide mechanism toward its desired position, the drive motor can lift the counterweight while the timing belt goes slack between the drive motor and the slide mechanism. Applying the full gravitational force of the slide mechanism against the obstruction could damage the slide mechanism or harm the obstruction, which could be a part of an operator's body. While control loop monitoring for excess position errors can limit the amount of overdrive, any amount of overdrive can unload the counterbalance transferring undesirable weight to the obstruction.

SUMMARY OF THE INVENTION

A counterbalance and drive system in accordance with certain embodiments preserves the counterbalancing of a vertically displaceable slide mechanism even while the slide mechanism encounters an unexpected obstruction along its downward path. Certain embodiments also feature a failsafe system to preserve counterbalancing in the event that a first flexible connection between the counterweight and slide mechanism should fail.

One example of such a counterbalance and drive system for a machine slide mechanism includes a machine mount supporting a vertically displaceable slide mechanism and a counterweight. A first flexible connector suspended from the machine mount interconnects the slide mechanism and the counterweight forming a counterbalance system in which gravitational force acting on the slide mechanism is at least partially opposed by gravitational force acting on the counterweight. A drive system for the vertically displaceable slide mechanism includes a second flexible connector suspended from the machine mount and interconnecting the slide mechanism and the counterweight. The drive system also includes both a drive motor operatively engaged along a length of the second flexible connector for vertically displacing the slide mechanism and a compliant connector operating within a limited range of compliance for imparting a regulated amount of tension along at least a portion of the length of the second flexible connector between the engagement of the drive motor and the counterweight.

The compliant connector is preferably relatively displaceable within the limited range of compliance to accommodate overdriving of the second flexible connector without relatively displacing the counterweight with respect to the slide mechanism so that the gravitational force acting on the slide mechanism remains at least partially opposed by gravitational force acting on the counterweight through the first flexible connector. A controller is preferably arranged to respond to a detected overdriving of the second flexible connector to interrupt further displacement of the second flexible connector with respect to the displacement of the slide mechanism with the limited range of compliance.

Preferably, the regulated amount of tension imparted by the compliant connector within the limited range of compliance applies a lifting force on the counterbalance that only partially counteracts the gravitational force acting on the counterweight. However, the compliant connector can be further arranged to operate beyond the limited range of compliance as a part of a failsafe mechanism whereby, in response to a break in the connection between slide mechanism and the counterweight provided by the first flexible connector, the second flexible connector functions as a part of a backup counterbalance system interconnecting the slide mechanism and the counterweight so that the gravitational force acting on the slide mechanism remains at least partially opposed by the gravitational force acting on the counterweight. For example, the compliant connector can include a spring that imparts the regulated amount of tension within the limited range of compliance and a stop through which the second flexible connector interconnects the slide mechanism and the counterweight beyond the limited range of compliance so that a further amount of tension can be conveyed by the second flexible connector corresponding to a lifting force on the counterbalance that more fully counteracts the gravitational force acting on the counterweight.

Another example of a counterbalance and drive system for a machine slide mechanism includes the basic setup of a machine mount supporting a vertically displaceable slide mechanism and a counterweight. A first flexible connector suspended from the machine mount interconnects the slide mechanism and the counterweight for forming a counterbalance such that a gravitational force acting on the slide mechanism is at least partially opposed by a gravitational force acting on the counterweight through the transmission of a first amount of tension by the first flexible connector between the slide mechanism and the counterweight. A second flexible connector suspended from the machine mount also interconnects the slide mechanism and the counterweight. However, a drive motor is operatively engaged along a length of the second flexible connector for vertically displacing the slide mechanism and a tensioner imparts a second lesser amount of tension along a portion of the second flexible connector between the engagement of the drive motor and the counterweight to maintain the engagement between the drive motor and the second flexible connector.

The tensioner can include a resilient member that is displaceable within a limited range for imparting the lesser amount of tension along the second flexible connector. Preferably, the displacement of the resilient member accommodates a limited amount of overdriving of the second flexible connector without relatively displacing the counterweight with respect to the slide mechanism so that the gravitational force acting on the slide mechanism remains at least partially opposed by gravitational force acting on the counterweight through the first flexible connector.

In addition, the displacement of the resilient member can be limited by a stop for conveying greater amounts of tension along the second flexible connector. Preferably, the lesser amount of tension imparted by the tensioner applies a lifting force on the counterbalance that only partially counteracts the gravitational force acting on the counterweight. However, the tensioner can be further arranged together with the second flexible connector as a part of a failsafe mechanism whereby in response to a break in the connection between slide mechanism and the counterweight provided by the first flexible connector, the second flexible connector functions as a part of a backup counterbalance system interconnecting the slide mechanism and the counterweight so that the gravitational force acting on the slide mechanism remains at least partially opposed by the gravitational force acting on the counterweight.

In one arrangement of the tensioner, the tensioner includes a first part connected at a first point along the length of the second flexible connector, a second part connected at a second point along the length of the flexible connector, and a resilient member that imparts the resilient force between the first and second parts. In another arrangement of the tensioner, the tensioner includes a first part connected to the machine mount, a second part in engagement with a side of the second flexible connector, and a resilient member that imparts the resilient force between the first and second parts. In either arrangement the tensioner can also include a stop that limits relative movement between the first and second parts.

The first flexible member preferably has a length that extends between two ends. A first portion of the length first flexible member can extend from a first of the two ends that is connected to the slide mechanism to the counterweight. A second portion of the first flexible member can extend from the counterweight to a second of the two ends that is connected to the slide mechanism. A median portion of the length of the first flexible member can be connected to the counterweight through a bearing that maintains both a local physical separation and a balance of tensile forces between the first and second portions of the length of the first flexible member. The second flexible connector can include a first end connected to the slide mechanism between the first and second ends of the first flexible connector and a second end connected to the counterweight in alignment with the bearing that maintains the local physical separation between the first and second portions of the length of the first flexible member. The arrangement allows both flexible connectors to be connected to the centers of gravity of both the slide mechanism and the counterweight.

BRIEF DESCRIPTION OF THE DRAWING FIGURES

FIG. 6 is an enlarged detail view of area A in the rear elevational view of FIG. 4 showing a compliant connector.

FIG. 7 is a cross-sectional view of the compliant connector taken along line x-x of FIG. 6.

DETAILED DESCRIPTION OF THE INVENTION

Figure 1:
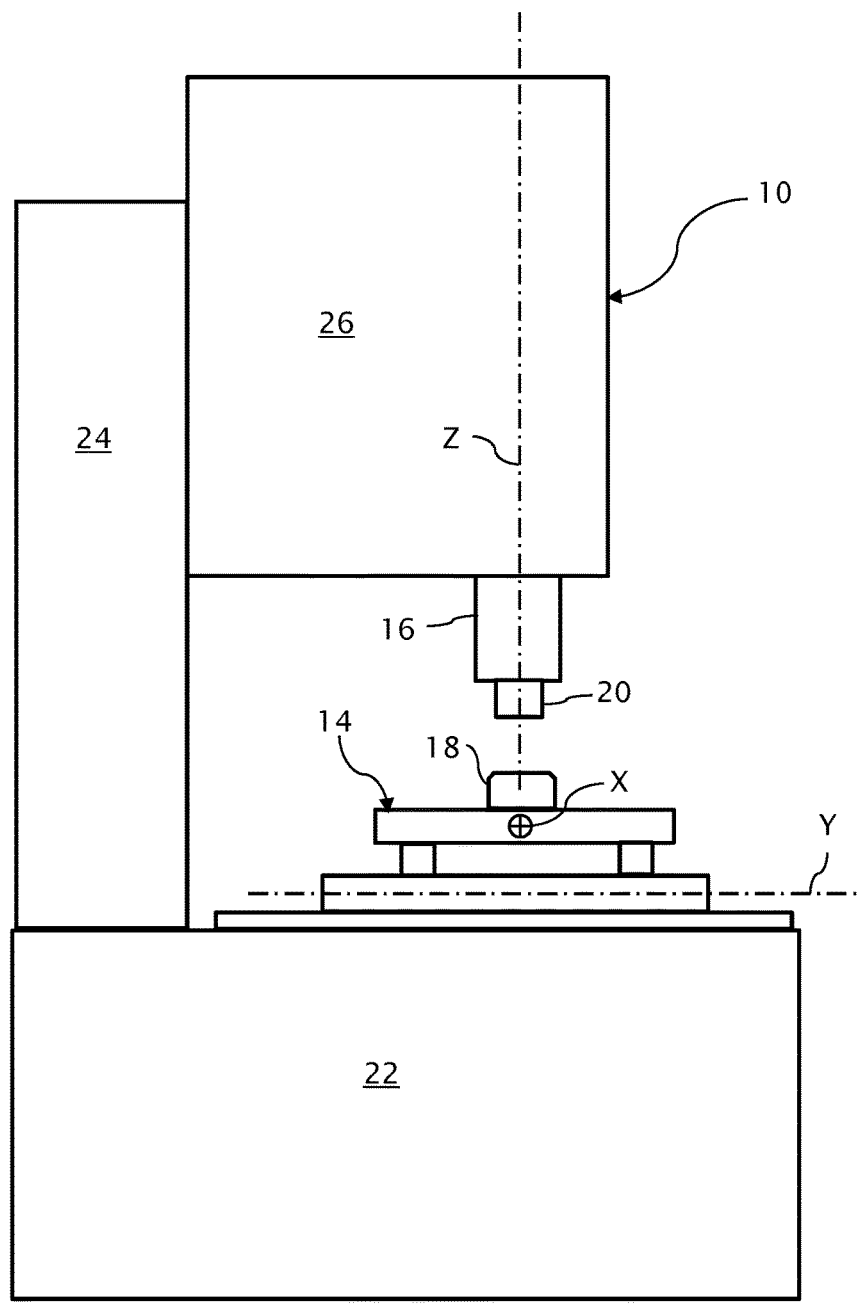
FIG. 1 is a schematic side elevational view of a multi-axis measuring machine with a vertically displaceable slide mechanism.
Figure 2:
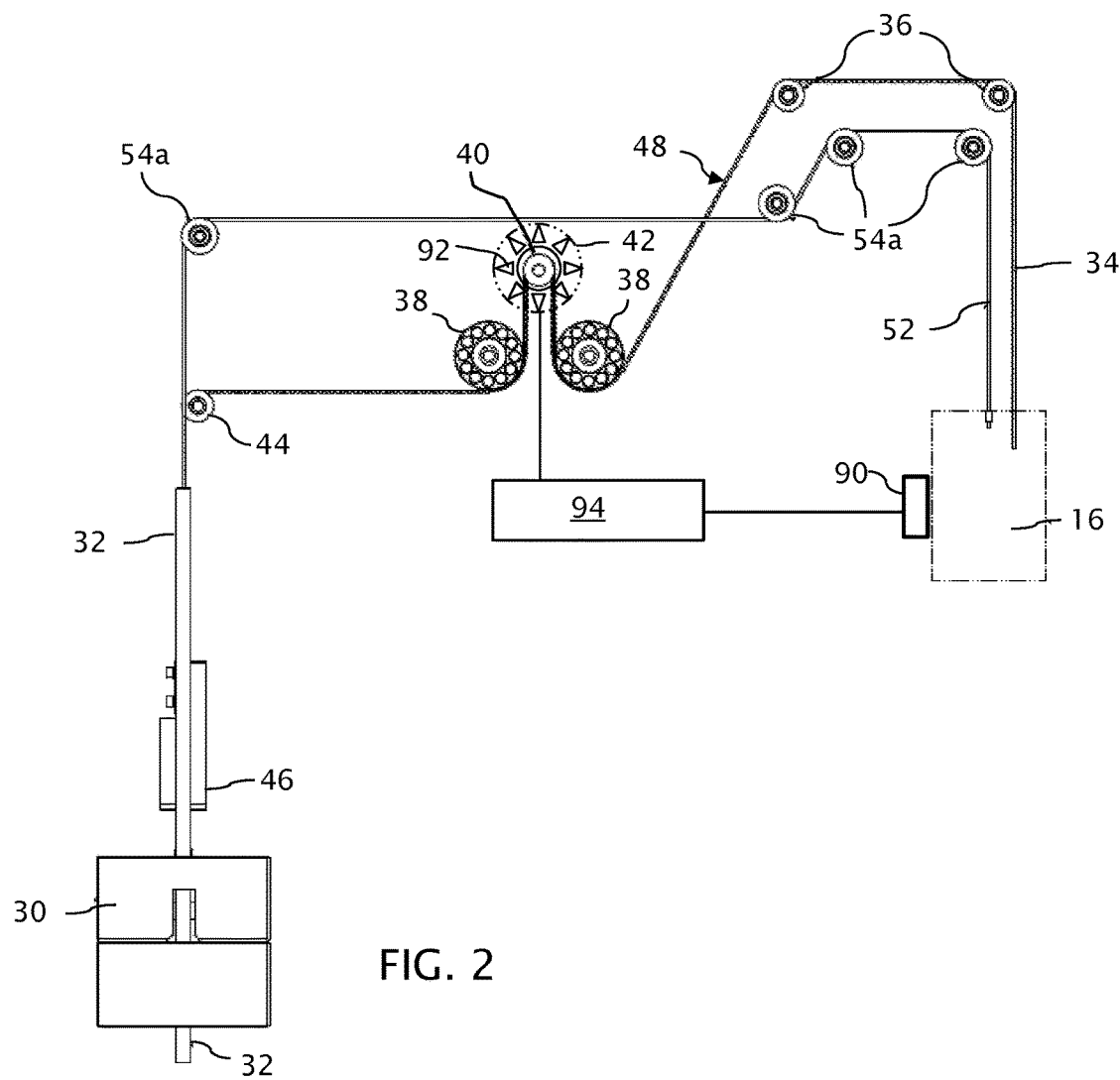
FIG. 2 is a side elevational view of a counterbalance and drive system for the vertically displaceable slide mechanism in which the slide mechanism is shown in phantom line.
Figure 3:
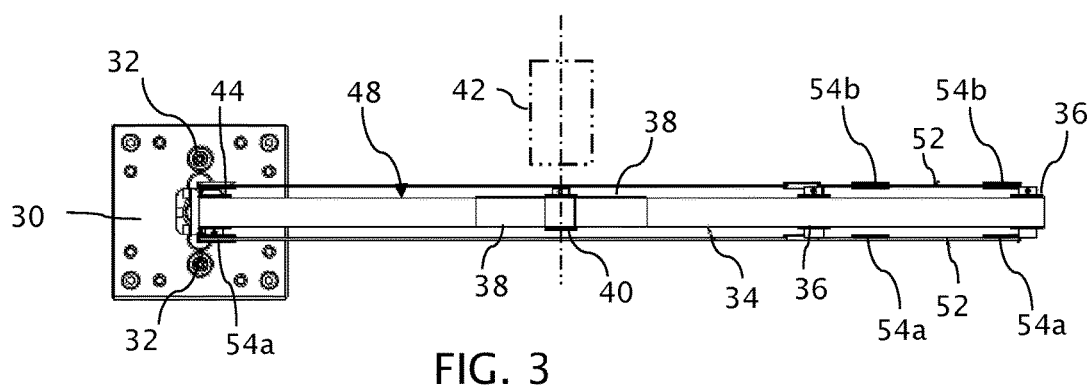
FIG. 3 is a top plan view of the counterbalance and drive system.
Figure 4:
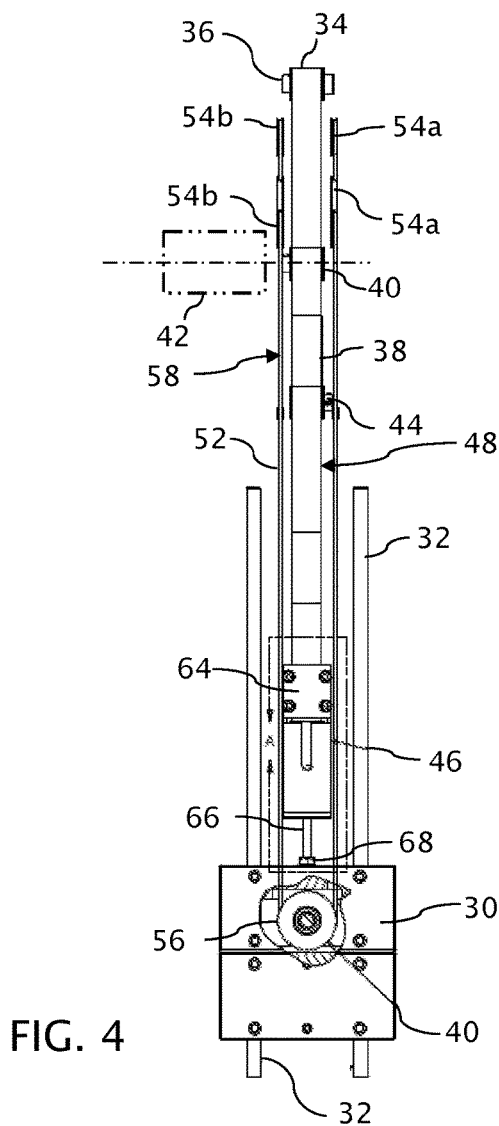
FIG. 4 is a rear elevational view of the counterbalance and drive system.
Figure 5:
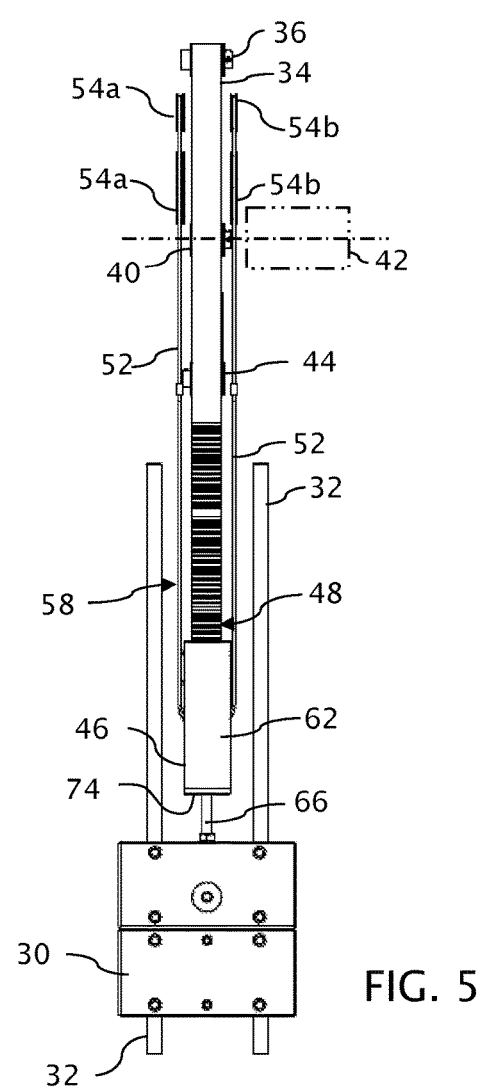
FIG. 5 is a front elevational view of the counterbalance and drive system.

A multi-axis machine 10 depicted in one of many possible configurations of a measuring machine, includes an x-y stage 14 for horizontally translating a test piece 18 along X and Y coordinate axes and a slide mechanism 16 for vertically translating a sensor 20 along a Z coordinate axis. The x-y stage 14 is supported on a machine base 22. The slide mechanism 16 is supported in a slide support 26 carried on a column 24. As a measuring machine, the sensor 20 can be arranged, for example, as a mechanical or optical probe for taking localized measurements or as an objective lens for capturing information over a wider area of the test part 18. Other unseen portions of the sensor or other apparatus supporting the metrology functions of the machine can be housed in the slide support 26 within which the slide mechanism 16 in translatable.

The measuring machine 10 can be arranged with other combinations of translational axes relatively moving one or the other of the test piece 18 and the sensor 20, and one or more rotational axes can be added for relatively rotating or pivoting one or the other of the test piece 18 and the sensor 20. However, for purposes of certain embodiments, the slide mechanism 16 has a vertically displaceable mass influenced by the force of gravity. That is, if not otherwise restrained, the slide mechanism 16 would tend to move under force of gravity.

A counterbalance and drive system for the vertically displaceable slide mechanism 16 is shown in FIGS. 2-7. The slide mechanism 16, where shown, is depicted in phantom lines, and similar to other translatable stages is preferably guided for motion along the Z axis by suitable rails or ways. A counterweight 30 for the slide mechanism 16 is also mounted for linear motion along the Z axis. For example, the counterweight 30 can be arranged to track along vertical guide rails 32. Since the counterweight 30 is suspended for movement along a vertical axis and only requires confinement to prevent swinging in the event the machine 10 is jarred, the guidance system for the counterweight can be loose and not in immediate contact with the guide rails 32. However, if the counterweight were to be intended for displacement along an inclined axis or were to be supported by another machine axis subject to motion, the counterweight 30 could be arranged with conventional bearing surfaces for more securely engaging the guide rails 30.

One end of a linear timing belt 34, of appropriate size for the application, is attached directly to the slide mechanism 16, preferably anchored at or very near the center of gravity of the slide mechanism 16. A length of the linear timing belt 34 is threaded over or around timing pulleys 36 and idler pulleys 38 as needed in the system design to travel to a location that is convenient to place a drive pulley 40 intended to be driven directly or indirectly by a drive motor 42, which is shown in phantom line. From the drive pulley 40, the length of the timing belt can be further threaded over or around a timing pulley 44 and any number of other pulleys needed to travel to a location convenient for suspending the counterweight 30. However, instead of attaching the opposite end to the linear timing belt 34 directly to the counterweight 30, the opposite end of the timing belt 34 is attached to a compliant connector 46, which is in turn attached to the counterweight 30, preferably at or very near the center of gravity of the counterweight 30.

Thus, in the embodiment shown, the timing belt 34 together with the compliant connector 46 forms a flexible connector 48 extending from the slide mechanism 16 to the counterweight 30. The timing belt 34 exhibits flexibility for allowing the timing belt to bend, i.e., wrap, around the pulleys 36, 38, 40, and 44, while maintaining a fixed length. The compliant connector 46 exhibits longitudinal flexibility to accommodate limited variations in the length of the flexible connector 48 between the timing belt 34 and the counterweight 30. The various pulleys 36, 38, 40, and 44 suspend the flexible connector 48 from a machine mount, such as the slide support 26 or column 24. The timing belt 34 and drive pulley are preferably toothed for efficiently converting rotary to translational motion. However, other types of drives could also be used including combinations of a chain and sprockets or a perforated metal tape and pulleys with bull nose pins.

Also attached to the slide mechanism 16 near the linear timing belt 34 is one end of a cable 52, which is made of steel braiding or other material that is flexible for accommodating a limited amount of bending but is of adequate strength to support tensile loading without stretching in length. A length of the cable 52 is threaded over or around a series of grooved idler pulleys 54a to reach the counterweight 30. At the counterweight 30, the cable 52 wraps around one or more grooved idler pulleys, such as the grooved idler pulley 56 seen in FIG. 4, that are mounted to the counterweight 30 to redirect a further length of the cable 52 along a similar return path to the slide mechanism 16, where an opposite end of the cable 52 is attached to the slide mechanism 16.

The return path for the cable 52 is defined by a series of grooved idler pulleys 54b, which are mounted coaxially with the grooved idler pulleys 54a. The pulley 56 displaces the cable 52 to either side of the of the timing belt 34 and the compliant coupling 46, and the coaxially mounted pairs of idler pulleys 54a and 54b maintain a desired offset of the parallel lengths of the cable 52, such that the opposite ends of the cable 54 are attached to the slide mechanism 16 on either side of the timing belt 34. Thus, the two ends of the cable 52 straddling the timing belt 34 allow both the cable 52 and the timing belt 34 to be attached to the slide mechanism 16, preferably at or very near the center of gravity of the slide mechanism 16. Similarly, the pulley 56 can be mounted within the counterbalance 30 in a position of alignment with the mounting of the compliant connector 46 so that both mountings are preferably at or very near the center of gravity of the counterbalance 30 so as not to induce any tilting or twisting of the slide mechanism 16 or the counterweight 30.

The paired series of pulleys 54a and 54b suspend the cable 52 from a machine mount, such as the slide support 26 or column 24. The double length cable 52, as so suspended, forms a flexible connector 58 interconnecting the slide mechanism 16 and the counterweight 30 so that a gravitational force acting on the slide mechanism 16 is at least partially opposed by a gravitational force acting on the counterweight 30. In addition, one or both ends of the cable 52 are attached to the slide mechanism 16 with a means to adjust the overall length of the cable 52 to allow for proper adjustment of the relative length of the compliant connector 46. Although the flexible connector 58 is formed as a cable 52, the flexible connector 58 can take a variety of other forms including as a chain or belt arranged for carrying the desired tensile loads.

As particularly shown in FIG. 7, the linear timing belt 34 is clamped to a housing 62 of the compliant connector 46 via belt clamp plate 64. A bolt 66 extends through the housing 62 into threaded engagement with the counterweight 30. Jam nut 68 locks the bolt 66 in engagement with the counterweight 30. Along a length of the bolt 66 within the housing 62, a compression spring 70 extends from a spacer washer 72 at a head end of the bolt 66 to a spring capture plate 74 at the bottom of the housing 62.

The spring force exerted by the compression spring 16 places the timing belt 34 under an amount of tension, which is considerably less than the amount of tension required to lift the full weight of the counterbalance 30 but is preferably sufficient to prevent the timing belt 34 from becoming slack or skipping teeth on the drive pulley 40 during the raising or lowering of the slide mechanism 16. In addition, the compression spring 70 is preferably compressible over a length that allows the timing belt 34 to be overdriven through a distance capable triggering a stop condition interrupting further travel of the timing belt 34 before the compression spring 70 becomes fully compressed.

Under control of the drive motor 42 via the timing belt 34, the slide mechanism 16 can be raised or lowered by prescribed amounts while the counterweight 30 is correspondingly lowered or raised via the cable 52. Since the cable 52 has a fixed length that remains under tension by the offsetting weights of the slide mechanism 16 and the counterweight 30, the compliant coupler 46 also tends to remain at the same length with the compression spring 70 exhibiting the desired amount of tension along the timing belt 34 between the drive pulley 40 and the counterweight 30.

If the slide mechanism 16 encounters an obstruction while being lowered and can no longer move downward, the drive motor 42 tends to continue to push the timing belt 34 towards the slide mechanism 16 creating slack in the timing belt 34 between the drive pulley 40 and the slide mechanism 16. Between the drive pulley 49 and the counterweight 30, the overdriving of the timing belt 34 tends to lift the housing 62 of the compliant connector 46 further compressing the compression spring 70, thereby extending the length of the flexible connector 48.

Thus, instead of lifting the counterweight 30, which would disengage the counterweight 30 from the slide mechanism 16 allowing all of the weight of the slide mechanism 16 to rest upon the obstruction, the compliant connector 46 accommodates some overdriving of the timing belt 34 so that any increase in the lifting force applied to the counterweight 30 by the timing belt 34 is limited to any additional spring force accompanying the further compression of the compression spring 70. Preferably, the increase in spring force with the further compression of the compression spring 70 is minimal to maintain no more than a desired amount of tension in the timing belt 34 and to avoid any significant increase in the lifting force on the counterweight 30, which would cancel out some of the desired counterbalance effect otherwise provided the cable 52.

To limit the amount of permitted overtravel of the timing belt 34 to within a range of compliance of the compliant connector 46, e.g., to within the range of compression of the compression spring 70, a control loop is preferably provided that responds to an excess position error by stopping the drive motor 42. As a part of such a control loop, one or more position sensors 90 and 92 can be provided for detecting an overdriving of the timing belt 34 with respect to the slide mechanism 16 in which the displacement of the timing belt 34 by the drive motor 42 exceeds the displacement of the slide mechanism 16. The sensor 90 monitors the translational position of the slide mechanism 16 along the Z axis. The sensor 92 monitors the rotational position of the drive motor 42 for determining an expected displacement of the timing belt 34. A controller 94, which is connected to both sensors 90 and 92 as well as the drive motor 42, responds to detected overdriving of the timing belt 34, as a disparity between the displacements of the timing belt 34 and the slide mechanism 16, by stopping the drive motor 42. The overdrive condition is preferably detected within the limited range of compliance of the compliant connector 46 through which excess travel of the timing belt 34 can be accommodated without cancelling out the desired counterbalance effects of the cable 52.

Once the machine 10 is in such a stop condition, the slide mechanism 16 can be easily manually lifted because the counterweight 30 is still effective through the cable 52 for offsetting the weight of the slide mechanism 16. Once the slide mechanism 16 is lifted, the obstruction can be moved out of the way and the slide mechanism 16 can then be manually lowered back down to its intended position where there is no slack in the timing belt 34 and the machine 10 can be put back into run mode to reinstate the desired drive motion.

While the compliant coupler exhibits a range of compliance sufficient to accommodate an amount of overtravel by the timing belt 34 required to detect an overdrive condition and stop further overtravel of the timing belt 34, the range of compliance is preferably limited as a further failsafe feature. For example, the compression spring 70 preferably compresses down to a solid height at which further compression is ended. When the spring 70 has fully compressed, no further displacement between the housing 62 and the bolted connection to the counterweight 30 is possible and the flexible connector 48 is no longer extendible in length. Thus, should a break occur in the flexible connection 58 supported by the cable 52 between the slide mechanism 16 and the counterweight 30, the flexible connection 48 is extendible to a maximum length at which the flexible connection functions as a part of a backup counterbalance system interconnecting the slide mechanism 16 and the counterweight 30 so that the gravitational force acting on the slide mechanism 16 remains at least partially opposed by the gravitational force acting on the counterweight 30.

As a part of a failsafe system, the timing belt 34 and compliant connector 46 are preferably designed to withstand the tension required to bear the weight of both the slide mechanism 16 and the counterweight 30. As so counterbalanced, the drive motor 42 can continue to operate to move the slide mechanism 16 to a safe position. A sensor in contact with the cable 52 can be used to detect a break in the cable 52 or its connections to the slide mechanism 16 and counterweight 30 for directing the machine 10 to enter a safe mode.

The compliant connector 46 can take a variety of forms as a tensioner for the timing belt 34, including arranging for other forms of resilience for providing the desired tension. Other arrangements of stops can also be used for limiting the range of compliance. For example, a tension spring can be used together with a separate physical stop to limit the extension of the tension spring.

Figure 8:
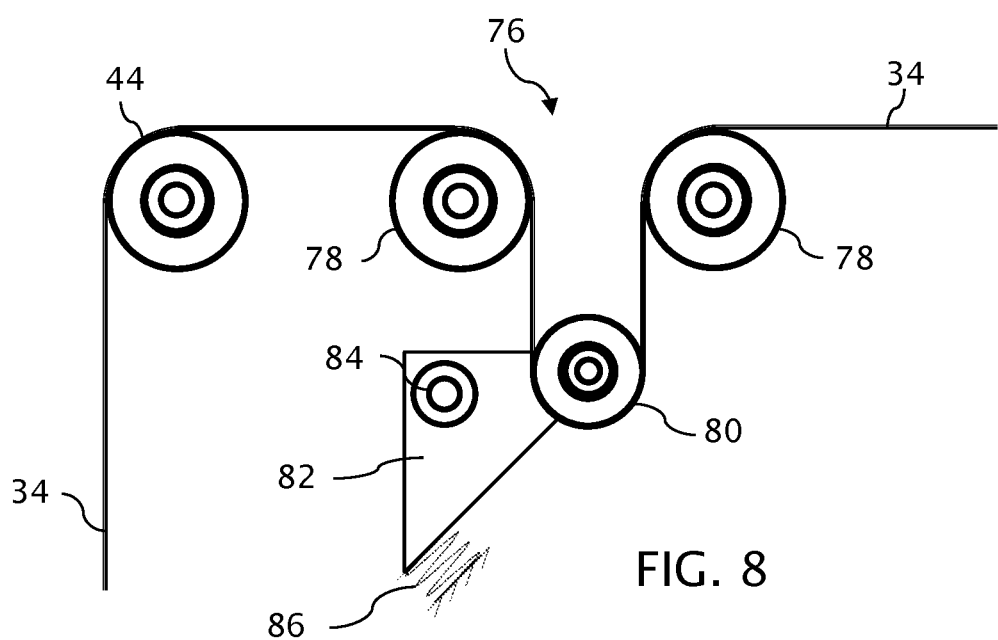
FIG. 8 is a schematic side elevational view of a portion of the drive system showing an alternative type of compliant connector.

Instead of tensioning the timing belt 34 by resilient forces acting to contract the length of the flexible connector 48, tension can be applied to the timing belt 34 by stretching the length of the pathway over which the timing belt 34 is arranged to travel between the slide mechanism 16 and the counterweight 30. For example, FIG. 8 depicts a compliant connector 76 as different form of tensioner for applying a lateral force against the timing belt 34 in a position located between the drive pulley 40 and timing pulley 44. Idler pulleys 78 direct the timing belt 34 around a tensioner pulley 80 that is rotatably mounted at one end of a pivot arm 82. A pivot 84 attaches the pivot arm 82 to a machine mount, such as the slide support 26 or column 24, for displacing the tensioner pulley 80 relative to the idler pulleys 78. A compression spring 86 engages a remote end of the pivot arm 82 for urging the tensioner pulley 80 away from the idler pulleys 78 to preload the timing belt 34 with a desired amount of tension. The compression spring 86 also works against a machine mount, such as the slide support 26 or column 24, to support the desired amount of force against the pivot arm 82.

With the alternative compliant connector arrangement of FIG. 8 for tensioning the timing belt 34, the timing belt 34 can be connected directly to the counterweight 30, such as with an appropriate clamping mechanism, without providing any resilient adjustment to the length of timing belt 38 or any other portion of the flexible connector 48. If the timing belt 34 is subjected to overtravel, such as when the slide mechanism 16 might encounter an obstacle while being lowered, any additional tension that might be imparted by the drive motor 42 toward lifting the counterweight 30 is first absorbed by the compression spring 86, which compresses to allow the tensioner pulley 80 to displace and thereby shorten the pathway for the timing belt 34 by the amount of the overtravel.

The supported range of displacement until the compression spring is compressed to a solid height is preferably sufficient to accommodate an amount of overtravel by the timing belt 34 required to detect an overdrive condition and stop further overtravel of the timing belt 34. Within the range at which the tensioner pulley 80 is displaceable, the cable 52 remains taught for continuing to counterbalance the weight of the slide mechanism 16 against the weight of the counterweight 30, even while the slide mechanism 16 rests upon an obstruction.

A limit to the compliance of the compliant connector 76 set by a solid stop between the remote end of the pivot arm 82 and the machine mount also contributes to a failsafe system for maintaining a counterbalance between the slide mechanism 16 and the counterweight 30 even if the cable 52 or any other portion of the flexible connector 58 were to break. Once the stop is reached and the length of the pathway for the timing belt 34 cannot further contract, tension can increase along the timing belt 34 as a substitute for the tension along the cable 52 to support a backup counterbalance system interconnecting the slide mechanism 16 and the counterweight 30 so that the gravitational force acting on the slide mechanism 16 remains at least partially opposed by the gravitational force acting on the counterweight 30. As so counterbalanced, the drive motor 42 can continue to operate to move the slide mechanism 16 to a safe position.

While only a limited number of embodiments have been disclosed, those of skill in this art will appreciate that variants of the disclosed features and functions or alternatives can be combined into other systems or applications within the overall teaching provided. Various improvements are also to be expected and intended to be encompassed by the following claims.

The invention claimed is:

1. A counterbalance and drive system for a machine slide mechanism comprising:
    a machine mount supporting a vertically displaceable slide mechanism and a counterweight;
    a counterbalance system including a first flexible connector suspended from the machine mount and interconnecting the slide mechanism and the counterweight so that a gravitational force acting on the slide mechanism is at least partially opposed by a gravitational force acting on the counterweight;
    a drive system including a second flexible connector suspended from the machine mount and interconnecting the slide mechanism and the counterweight, the drive system including:
        a drive motor operatively engaged along a length of the second flexible connector for vertically displacing the slide mechanism; and
        a compliant connector operating within a limited range of compliance imparts a regulated amount of tension along at least a portion of the length of the second flexible connector between the engagement of the drive motor and the counterweight.

2. The counterbalance and drive system of claim 1 further comprising one or more sensors for detecting an overdriving of the second flexible connector with respect to the slide mechanism in which the displacement of the second flexible connector by the drive motor exceeds the displacement of the slide mechanism.

3. The counterbalance and drive system of claim 2 in which the compliant connector is relatively displaceable within the limited range of compliance to accommodate the overdriving of the second flexible connector without relatively displacing the counterweight with respect to the slide mechanism so that the gravitational force acting on the slide mechanism remains at least partially opposed by a gravitational force acting on the counterweight through the first flexible connector.

4. The counterbalance of claim 3 further comprising a controller that responds to the detected overdriving of the second flexible connector to interrupt further displacement of the second flexible connector with respect to the displacement of the slide mechanism with the limited range of compliance.

5. The counterbalance and drive system of claim 4 in which the one or more sensors include a first sensor for measuring displacement of the slide mechanism and a second sensor for measuring displacement of the second flexible connector as driven by the drive motor, and the controller is arranged to respond to differences between the measured displacement of the slide mechanism and the measured displacement of the second flexible connector to interrupt movement imparted by the drive motor to the second flexible connector.

6. The counterbalance and drive system of claim 1 in which the regulated amount of tension imparted by the compliant connector within the limited range of compliance applies a lifting force on the counterbalance that only partially counteracts the gravitational force acting on the counterweight.

7. The counterbalance and drive system of claim 6 in which the compliant connector is further arranged to operate beyond the limited range of compliance as a part of a failsafe mechanism whereby in response to a break in the connection between slide mechanism and the counterweight provided by the first flexible connector, the second flexible connector functions as a part of a backup counterbalance system interconnecting the slide mechanism and the counterweight so that the gravitational force acting on the slide mechanism remains at least partially opposed by the gravitational force acting on the counterweight.

8. The counterbalance and drive system of claim 7 in which the compliant connector includes a spring that imparts the regulated amount of tension within the limited range of compliance and a stop through which the second flexible connector interconnects the slide mechanism and the counterweight beyond the limited range of compliance so that a further amount of tension can be conveyed by the second flexible connector corresponding to a lifting force on the counterbalance that more fully counteracts the gravitational force acting on the counterweight.

9. The counterbalance and drive system of claim 1 in which the compliant connector forms a part of the length of the second flexible connector so that, within the limited range of compliance of the compliant connector, the second flexible connector is resiliently extendible by a limited amount between the drive motor and the counterweight.

10. The counterbalance and drive system of claim 9 in which the compliant connector exerts a resilient contracting force along the length of the flexible connector within the limited range of compliance for drawing the flexible connector taut against the counterweight.

11. The counterbalance and drive system of claim 10 in which the compliant connector includes a stop that limits the extension of the second flexible connector beyond the limited range of compliance of the compliant connector.

12. The counterbalance and drive system of claim 10 in which the compliant connector includes a first part connected at a first point along the length of the second flexible connector, a second part connected at a second point along the length of the flexible connector, and a resilient member that imparts the resilient force between the first and second parts within the limited range of compliance.

13. The counterbalance and drive system of claim 12 in which the compliant connector includes a stop that limits relative movement between the first and second parts beyond the limited range of compliance.

14. The counterbalance and drive system of claim 13 in which the second point along the length of the second flexible connector corresponds to an end of the second flexible connector that is connected to the counterweight.

15. The counterbalance and drive system of claim 1 in which the compliant connector resiliently supports the second flexible connector from the machine mount along the length of the second flexible connector between the engagement of the drive motor and the counterweight.

16. The counterbalance and drive system of claim 15 in which the compliant connector applies a resilient force normal to the length of the flexible connector within the limited range of compliance for drawing the flexible connector taut against the counterweight.

17. The counterbalance and drive system of claim 16 in which the compliant connector includes a first part connected to the machine mount, a second part in engagement with a side of the second flexible connector, and a resilient member that imparts the resilient force between the first and second parts within the limited range of compliance.

18. The counterbalance and drive system of claim 17 in which the compliant connector includes a stop that limits relative movement between the first and second parts beyond the limited range of compliance.

19. The counterbalance and drive system of claim 1 in which the first flexible connector and the second flexible connector are both connected to the slide mechanism at a center of gravity of the slide mechanism.

20. The counterbalance and drive system of claim 19 in which the first flexible connector and the second flexible connector are both connected to the counterweight at a center of gravity of the counterweight.

21. The counterbalance and drive system of claim 1 in which the first flexible member has a length that extends between two ends, and a first portion of the length first flexible member extends from a first of the two ends that is connected to the slide mechanism to the counterweight and a second portion of the first flexible member extends from the counterweight to a second of the two ends that is connected to the slide mechanism.

22. The counterbalance and drive system of claim 21 in which a median portion of the length of the first flexible member is connected to the counterweight through a bearing that maintains both a local physical separation and a balance of tensile forces between the first and second portions of the length of the first flexible member.

23. The counterbalance and drive system of claim 22 in which the second flexible connector includes a first end connected to the slide mechanism between the first and second ends of the first flexible connector and a second end connected to the counterweight in alignment with the bearing that maintains the local physical separation between the first and second portions of the length of the first flexible member.

24. A counterbalance and drive system for a machine slide mechanism comprising:
  a machine mount supporting a vertically displaceable slide mechanism and a counterweight;
  a first flexible connector suspended from the machine mount interconnecting the slide mechanism and the counterweight for forming a counterbalance such that a gravitational force acting on the slide mechanism is at least partially opposed by a gravitational force acting on the counterweight through a transmission of a first amount of tension by the first flexible connector between the slide mechanism and the counterweight;
  a second flexible connector suspended from the machine mount interconnecting the slide mechanism and the counterweight;
  a drive motor operatively engaged along a length of the second flexible connector for vertically displacing the slide mechanism;
  a tensioner that imparts a second lesser amount of tension along a portion of the second flexible connector between the engagement of the drive motor and the counterweight to maintain the engagement between the drive motor and the second flexible connector.

25. The counterbalance and drive system of claim 24 in which the lesser amount of tension imparted by the tensioner applies a lifting force on the counterbalance that only partially counteracts the gravitational force acting on the counterweight.

26. The counterbalance and drive system of claim 25 in which the tensioner is further arranged together with the second flexible connector as a part of a failsafe mechanism whereby in response to a break in the connection between slide mechanism and the counterweight provided by the first flexible connector, the second flexible connector functions as a part of a backup counterbalance system interconnecting the slide mechanism and the counterweight so that the gravitational force acting on the slide mechanism remains at least partially opposed by the gravitational force acting on the counterweight.

27. The counterbalance and drive system of claim 24 in which the tensioner includes a resilient member that is displaceable within a limited range for imparting the lesser amount of tension along the second flexible connector.

28. The counterbalance and drive system of claim 27 in which the displacement of the resilient member is limited by a stop for conveying greater amounts of tension along the second flexible connector.

29. The counterbalance and drive system of claim 24 in which the tensioner includes a first part connected at a first point along the length of the second flexible connector, a second part connected at a second point along the length of the flexible connector, and a resilient member that imparts the resilient force between the first and second parts.

30. The counterbalance and drive system of claim 29 in which the tensioner includes a stop that limits relative movement between the first and second parts.

31. The counterbalance and drive system of claim 24 in which the tensioner includes a first part connected to the machine mount, a second part in engagement with a side of the second flexible connector, and a resilient member that imparts the resilient force between the first and second parts.

32. The counterbalance and drive system of claim 31 in which the tensioner includes a stop that limits relative movement between the first and second parts.

33. The counterbalance and drive system of claim 24 further comprising one or more sensors for detecting an overdriving of the second flexible connector with respect to the slide mechanism in which the displacement of the second flexible connector by the drive motor exceeds the displacement of the slide mechanism.

34. The counterbalance and drive system of claim 33 in which the tensioner includes a resilient member that is relatively displaceable within a limited range to accommodate the overdriving of the second flexible connector without relatively displacing the counterweight with respect to the slide mechanism so that the gravitational force acting on the slide mechanism remains at least partially opposed by a gravitational force acting on the counterweight through the first flexible connector.

35. The counterbalance of claim 34 further comprising a controller that responds to the detected overdriving of the second flexible connector to interrupt further displacement of the second flexible connector with respect to the displacement of the slide mechanism with the limited displacement range of the resilient member.

36. The counterbalance and drive system of claim 24 in which the first flexible member has a length that extends between two ends, a first portion of the length first flexible member extends from a first of the two ends that is connected to the slide mechanism to the counterweight, a second portion of the first flexible member extends from the counterweight to a second of the two ends that is connected to the slide mechanism, and a median portion of the length of the first flexible member is connected to the counterweight through a bearing that maintains both a local physical separation and a balance of tensile forces between the first and second portions of the length of the first flexible member.

37. The counterbalance and drive system of claim 36 in which the second flexible connector includes a first end connected to the slide mechanism between the first and second ends of the first flexible connector and a second end connected to the counterweight in alignment with the bearing that maintains the local physical separation between the first and second portions of the length of the first flexible member.

* * * * *